United States Patent Office 3,580,906
Patented May 25, 1971

3,580,906
STARCH LEVULINATES
Edward Bernasek, Winston-Salem, N.C., and Calley Neil Eaton, New York, N.Y., assignors to R. J. Reynolds Tobacco Company, Winston-Salem, N.C.
No Drawing. Filed Sept. 25, 1968, Ser. No. 762,645
Int. Cl. C08b 19/02
U.S. Cl. 260—233.5    5 Claims

ABSTRACT OF THE DISCLOSURE

Levulinate esters of starch are prepared by reacting starch with alpha-angelica lactone under controlled conditions of temperature and pH. The resulting starch levulinates may be used in food, cosmetic, adhesive, and paper and textile sizing applications, etc.

BACKGROUND OF THE INVENTION

Field of the invention

This invention relates to starch derivatives, particularly to a method for the preparation of levulinate esters of starch, and, more particularly, to the novel derivatives obtained thereby.

DESCRIPTION OF THE PRIOR ART

Starch esters, such as acetates and succinates, are presently manufactured for use in the food and paper industries. Levulinic acid itself has been suggested for use in foods as an acidulant, preservative and flavoring agent. No reference in the patent or chemical literature mentioning starch levulinates is known.

SUMMARY OF THE INVENTION

Starch levulinates are prepared by reaction of starch in either aqueous or non-aqueous medium with alpha-angelica lactone. These unique starch levulinates are produced according to the following reaction sequence:

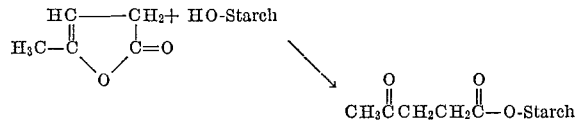

α-Angelica Lactone wherein HO-Starch represents the starch molecule. It has been further found that the resulting starch levulinates can be readily cross-linked, as required, for various applications where these derivatives can be used to advantage. It has been observed that cross-linking occurs in corn starch levulinate when the degree of substitution (D.S.) is greater than about 0.1. When the D.S. is below about 0.1, cross-linking is not apparent for corn starch levulinate but does occur with potato and waxy maize starch levulinates. D.S. as used herein is the average number of substituents per D-glucose unit in the starch molecule. For example, a D.S. of 1.0 indicates an average of one substituent for each D-glucose unit; the maximum possible D.S. is 3.0.

The applicable starch base materials which may be used in preparing these novel starch derivatives may be either in a dispersed, i.e., gelatinized, or an intact granule form. They may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; and fluidity or thin boiling starches prepared by enzyme conversion or by mild acid hydrolysis. In addition, the amylose and amylopectin fractions derived from any of the above noted starch bases may also be utilized. It is also possible to employ, in this process, any substituted ester or ether derivatives of these starch bases or their amylose or amylopectin fractions, provided that such ester or ether derivatives still retain hydroxyl groups which are available for further reaction in the above described reaction mechanism. Thus, the term "starch material" as used herein includes any amylaceous substances, whether untreated or chemically modified, which still retain free hydroxyl groups capable of entering into the novel reaction of this invention.

In general, when an aqueous medium is utilized in conducting the reaction, the novel process of this invention comprises the steps of first thoroughly dispersing the selected starch material in water, adjusting the pH and temperature of the slurry, and then adding alpha-angelica lactone at a controlled rate to the resulting starch dispersion while maintaining the pH by addition of base. The reaction takes place in the presence of either alkaline or acidic catalyst. Applicable alkaline catalysts include alkali metal hydroxides, alkaline-earth hydroxides, quaternary ammonium bases, alkali metal phosphates, and salts of weak acids, etc. The reaction is ordinarily carried out at temperatures ranging from about 50 to 200° F. and preferably from about 75 to 125° F. The pH level of the system is maintained throughout the course of the reaction in the range of from about 4 to 11 and preferably from about 7 to 9.5. The pH of the system is maintained at the latter level by the addition, to the system, of sufficient portions of an aqueous solution containing about 30%, by weight, of any of the above mentioned alkaline catalysts, such as triethylamine, may be used in conjunc-chloride.

Upon the completion of the addition of the lactone the reaction system is maintained under agitation at the preferred pH level and temperature. The reaction mixture is then neutralized and the product is filtered, washed and air-dried.

Where a non-aqueous medium is utilized, the reaction between the lactone and the previously dispersed starch material may be conducted in the presence of either basic or acidic catalyst. Thus, applicable base catalysts include such tertiary amines as pyridine, picoline, morpholine, and N-benzyltrimethylammonium hydroxide, etc. These basic catalysts may serve a double function by also acting as solvents for the system. Other tertiary amine base catalysts, such as tri-ethylamine, may be used in conjunction with solvents such as dimethylformamide and dimethylsulfoxide. Applicable acid catalysts include sulfuric acid, phosphoric acid, benzenesulfonic acid, methanesulfonic acid, and p-toluenesulfonic acid. Such catalysts are usually utilized in conjunction with solvents such as acetic acid.

In any event, in these non-aqueous media, the lactone is added to the solvent dispersion of the starch material at a controlled rate. The reaction is ordinarily carried out at temperatures ranging from about 50 to 200° F.; preferably about 180 to 200° F. Upon the completion of the addition of the lactone, the reaction system is maintained under agitation at the selected temperature. The resulting reaction product is isolated by being filtered, washed, and dried at room temperature and then under vacuum at a temperature of from about 100 to 200° F. for a period of about 6 to 24 hours.

With respect to proportions, in both the aqueous and non-aqueous systems the solvent should be present in a concentration of from about 1 to 20 parts, by weight, per part, by weight, of starch material. The concentration of the lactone used is dependent on the degree of substitution of levulinyl groups in the final derivative which is desired by the practitioner. Thus, concentrations ranging as high as about 300%, as based on the weight of starch base, may be utilized.

In either aqueous or non-aqueous reaction media, the rate of addition of the lactone as well as the time allocated for the complete reaction are dependent on the pH level and the temperature of the reaction mixture. Thus, in selecting applicable addition rates and overall reaction periods, the practitioner must weigh such conflicting factors as (1) the desirability for adding the lactone at a slow rate in order to prevent the build up of a high concentration of the lactone which may lead to formation of undesired by-products such as $\beta$-angelica lactone; and (2) the need for a shorter reaction period in order to prevent any pronounced degradation of the starch material. As a general rule, however, increased reaction rates are favored at higher pH levels and temperatures while reduced addition rates and longer overall reaction periods are favored at lower pH levels and temperatures.

The products of this invention, because of their unique combination of properties, can be utilized in many applications. Thus, levulinate esters of starch containing less than about 15% by weight of levulinate groups are found to exhibit excellent stability, i.e., they do not retrograde or gel after storage at room temperature for several month. On cooking in boiling water, these starch esters yield pastes which are smoother, clearer, and more viscous than those derived from raw starch. These derivatives are, thus, ideally suited for use in food applications; textile, paper and glass fiber sizing; adhesive and structural products; surgical dusting powders; and cosmetic purposes, as well as in other applications wherein it may be desirable to effect the cross-linking of these novel derivatives.

DESCRIPTION OF THE PREFERRED EMBODIMENTS

The following examples will further illustrate embodiments of this invention. In these examples, all parts and percentages given are by weight unless otherwise noted.

EXAMPLE 1

Reaction of corn starch with $\alpha$-angelica lactone in aqueous medium

For the reaction between corn starch and $\alpha$-angelica lactone, the principal variables, the pH of the reaction, the temperature of the reaction, and the length of time of the reaction were varied. The following preferred procedure was used. Corn starch (1.0 mole) was suspended in 250 ml. of water. The temperature of the slurry was raised to 93° F., and the pH was adjusted to 8.7. $\alpha$-angelica lactone (0.1 mole) was added dropwise maintaining the pH at 8.7 by the simultaneous addition of a 7:1 mixture of saturated sodium chloride solution and 30% sodium hydroxide solution. The suspension was stirred vigorously for 1.0 hour at 93° F. The product was filtered, slurried successively in three 500-ml. portions of water and two 500-ml. portions of ethanol, filtered and air dried. The results of these tests are outlined in Table I.

TABLE I.—REACTION OF CORN STARCH WITH $\alpha$-ANGELICA LACTONE

| Test | pH | Temperature, °F. | Moles lactone per mole starch | Reaction time, hours | Percent Levulinyl | Yield | D.S. |
|---|---|---|---|---|---|---|---|
| 1 | 8.7 | 93 | 0.1 | 0.5 | 4.23 | 73.4 | .07 |
| 2 | 8.7 | 93 | 0.1 | 1.0 | 3.76 | 65.3 | .06 |
| 3 | 8.7 | 93 | 0.1 | 1.0 | 4.71 | 81.8 | .08 |
| 4 | 8.7 | 93 | 0.1 | 1.0 | 5.08 | 88.2 | .09 |
| 5 | 8.7 | 93 | 0.1 | 1.0 | 5.00 | 86.8 | .09 |
| 6 | 8.7 | 93 | 0.1 | 3.0 | 3.78 | 65.6 | .09 |
| 7 | 8.7 | 125 | 0.1 | 1.0 | 4.64 | 80.6 | .08 |
| 8 | 9.0 | 93 | 0.1 | 2.0 | 3.96 | 68.8 | .07 |
| 9 | 9.2 | 82 | 0.1 | 3.5 | 2.98 | 51.7 | .05 |
| 10 | 9.2 | 93 | 0.1 | 0.5 | 2.95 | 51.2 | .05 |
| 11 | 9.2 | 93 | 0.1 | 1.0 | 4.23 | 73.4 | .07 |
| 12 | 10.2 | 96 | 0.1 | 1.0 | 0.92 | 15.9 | .015 |
| 13 | 10.8 | 93 | 0.1 | 1.0 | 0.31 | 5.2 | .01 |
| 14 | 10.8 | 93 | 0.1 | 2.5 | --- | --- | --- |
| 15 | 8.0 | 93 | 0.2 | 2.5 | 4.19 | 38.5 | .07 |
| 16 | 9.2 | 82 | 0.2 | 2.5 | 6.88 | 63.2 | .12 |
| 17 | 9.2 | 93 | 0.2 | 0.5 | 6.48 | 59.5 | .11 |
| 18 | 9.2 | 93 | 0.2 | 2.5 | 7.59 | 69.7 | .13 |
| 19 | 9.2 | 93 | 0.2 | 7.0 | 7.26 | 66.7 | .13 |
| 20 | 9.2 | 97 | 0.2 | 2.5 | 6.94 | 63.7 | .12 |
| 21 | 9.2 | 104 | 0.2 | 1.0 | 7.59 | 69.7 | .13 |
| 22 | 9–10 | 75 | 0.4 | 4.5 | 1.93 | 9.6 | .03 |
| 23 | 9–10 | 120 | 0.4 | 61.0 | 4.50 | 22.5 | .08 |

EXAMPLE 2

This example shows that levulinic acid does not react with corn starch to form starch esters.

Corn starch (1.0 mole) was suspended in 243 g. of acetone containing 1.6 g. of $BF_3 \cdot Et_2O$. Levulinic acid (0.1 mole) was added dropwise. The mixture was stirred for 20 hours at 77° F. and then filtered. The product was slurried successively in three 200-ml. portions of acetone, filtered, dried in a vacuum oven for approximately one hour, and then air dried. By the same procedure another experiment was carried out for 70 hours at 115° F. There was no indication of the formation of a starch ester in either case.

EXAMPLE 3

The purpose of this example is to illustrate the production of levulinate esters of various starch materials other than corn starch.

Following the procedure described in Example 1, $\alpha$-angelica lactone was reacted with various types of starch materials at a pH of 8.7 and 9.3. The results of these experiments are shown in Table II.

TABLE II.—REACTION OF VARIOUS STARCH MATERIALS WITH $\alpha$-ANGELICA LACTONE

| Type of starch material | pH of reaction | Percent Levulinyl | Yield | D.S. |
|---|---|---|---|---|
| Hydroxyethylated corn starch | 9.3 | 2.92 | 50.7 | .05 |
| Potato starch | 9.3 | 3.61 | 62.7 | .06 |
| Waxy maize starch | 9.3 | 2.42 | 42.0 | .04 |
| Starch acetate [1] | 8.7 | 4.22 | 73.3 | .07 |
| Hydroxypropyl starch [2] | 8.7 | 3.73 | 64.8 | .06 |
| Do [2] | 8.7 | 3.89 | 67.5 | .07 |
| Do [2] | 8.7 | 1.99 | 69.1 | .03 |
| Acid-modified corn starch | 8.7 | 2.03 | 69.3 | .03 |
| Oxidized corn starch | 8.7 | 0.07 | 2.4 | .01 |

[1] Acetylated corn starch.
[2] Hydroxypropylated corn starch.

EXAMPLE 4

This example illustrates the use of a non-aqueous organic solvent medium in the novel levulinylation process of this invention.

The corn starch utilized in this procedure was activated by treatment with distilled water followed by gradual replacement of the water with glacial acetic acid, and dried under vacuum.

Following this activation procedure, 20 parts of the resulting activated corn starch, 150 parts of glacial acetic acid, and 1 part of phosphoric acid were introduced into a reaction vessel equipped with a reflux condenser and means for mechanical agitation. The vessel was then heated to a temperature of 130° to 140° F., whereupon 20.0 parts of $\alpha$-angelica lactone were added dropwise to the system over a period of 30 minutes. When the addition of $\alpha$-angelica lactone was completed, the temperature of the system was raised to 200° F. and the reaction was allowed to proceed at the latter temperature for 3 hours. The resulting reaction product was filtered, washed several times with ethanol, air-dried, and then dried under vacuum at a temperature of 120° F. for 24 hours.

The levulinate ester was found to contain 15.3%, by weight, of levulinyl groups, thus corresponding to a reaction efficiency of 30.4%.

EXAMPLE 5

This example illustrates the utilization of commercially dry starch in the novel levulinylation process of this invention.

A reaction vessel equipped with mechanical agitation was charged with 162 parts of corn starch (13.2% moisture), which previously had been treated with base in an aqueous slurry, filtered and allowed to air dry. Into the starch was sprayed 9.8 parts of α-angelica lactone. The contents of the vessel were then heated to a temperature of 120° F. and agitation was continued for 6.5 hours. The starch was then slurried in 1 liter of water, and the pH of the system was adjusted to a pH level of 8.3 by the addition of a 5% sodium hydroxide solution. The resulting product was filtered, washed with ethanol and water, and air-dried. This derivative contained 3.94%, by weight, of levulinyl groups; the latter concentration corresponds to a reaction efficiency of 68.4%.

What is claimed is:

1. Starch levulinate.
2. A process for producing starch levulinate, which process comprises reacting starch material with alpha-angelica lactone at a temperature in the range of about 50 to 200° F. and a pH in the range of about 4 to about 11.
3. The process of claim 2 wherein the reaction is carried out in an aqueous medium having a pH in the range of 7 to 9.5.
4. The process of claim 2 wherein the reaction is carried out in a non-aqeous liquid organic acid medium in the presence of an acid catalyst.
5. The process of claim 2 wherein the reaction is carried out in the absence of a liquid phase reaction medium.

References Cited

UNITED STATES PATENTS

| 2,660,577 | 11/1953 | Kerr et al. | 260—233.5 |
| 3,342,806 | 9/1967 | Chaudhuri | 260—233.5 |

DONALD E. CZAJA, Primary Examiner

M. I. MARQUIS, Assistant Examiner

U.S. Cl. X.R.

117—124, 139.5, 156; 260—233.3